United States Patent
Wendt et al.

(10) Patent No.: US 11,764,879 B2
(45) Date of Patent: Sep. 19, 2023

(54) OPTICAL WIRELESS CHARGING AND DATA TRANSMISSION SYSTEM

(71) Applicant: SIGNIFY HOLDING B.V., Eindhoven (NL)

(72) Inventors: Matthias Wendt, Wurselen (DE); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 174 days.

(21) Appl. No.: 17/598,322

(22) PCT Filed: Mar. 26, 2020

(86) PCT No.: PCT/EP2020/058554
§ 371 (c)(1),
(2) Date: Sep. 27, 2021

(87) PCT Pub. No.: WO2020/207812
PCT Pub. Date: Oct. 15, 2020

(65) Prior Publication Data
US 2022/0182154 A1    Jun. 9, 2022

(30) Foreign Application Priority Data
Apr. 8, 2019 (EP) .................................... 19167722

(51) Int. Cl.
*H04B 10/80* (2013.01)
*H02J 50/80* (2016.01)
(Continued)

(52) U.S. Cl.
CPC ............ *H04B 10/807* (2013.01); *H02J 50/30* (2016.02); *H02J 50/80* (2016.02); *H04B 10/116* (2013.01)

(58) Field of Classification Search
CPC ..... H04B 10/116; H04B 10/807; H02J 50/30; H02J 50/80
(Continued)

(56) References Cited

U.S. PATENT DOCUMENTS

| 2013/0154387 A1* | 6/2013 | Lee | H02J 50/80 307/104 |
| 2014/0008990 A1* | 1/2014 | Yoon | H02J 7/0044 307/104 |

(Continued)

FOREIGN PATENT DOCUMENTS

| CN | 208353023 U | 1/2019 |
| EP | 3001586 A1 | 3/2016 |

(Continued)

OTHER PUBLICATIONS

Jeremy Horwitz, venturebeat.com, "Apple Patent Filings and Energous FCC Approval Suggest Non-Contact Wireless Charging is Almost Ready", Dec. 28, 2017, pp. 1-3.
(Continued)

*Primary Examiner* — Dalzid E Singh

(57) ABSTRACT

According to one aspect disclosed herein, there is provided an optical wireless charging and data transmission system (100), the system comprising: a plurality of transmitter nodes (102,2020) operable to perform a first function of emitting a beam of light (104) to charge a receiver device (106) and a second function of emitting a beam of light (206) to transmit data to the receiver device (106); and a controller (108) configured, for each of the transmitter nodes, to perform a selection by selecting between performing the first function and the second function; wherein the controller is configured to perform the selection for each of the plurality of transmitter nodes based on one or more properties of the system comprising the spatial configuration of the system (100) and one or more properties of the receiver device (106)

(Continued)

comprising the location of the receiver device relative to the system, by selecting a first transmitter node (202) of the plurality of transmitter nodes (102, 202) for transmitting data to the receiver device (106) and selecting a second transmitter node (102) of the plurality of transmitter nodes for charging the receiver device (106).

13 Claims, 3 Drawing Sheets

(51) Int. Cl.
*H02J 50/30* (2016.01)
*H04B 10/116* (2013.01)

(58) Field of Classification Search
USPC .......................................................... 398/171
See application file for complete search history.

(56) References Cited

U.S. PATENT DOCUMENTS

| | | | |
|---|---|---|---|
| 2016/0049831 A1* | 2/2016 | Nakano | G01R 29/0878 307/104 |
| 2017/0018957 A1 | 1/2017 | Lucrecio et al. | |
| 2017/0077765 A1* | 3/2017 | Bell | H02J 50/60 |
| 2018/0123403 A1* | 5/2018 | Kare | H01S 5/06216 |
| 2018/0138755 A1 | 5/2018 | Nugent, Jr. et al. | |
| 2018/0219623 A1* | 8/2018 | Bitra | H04B 10/116 |
| 2020/0403457 A1* | 12/2020 | Nydell | H04B 10/616 |
| 2021/0075269 A1* | 3/2021 | Biderman | H02J 50/40 |

FOREIGN PATENT DOCUMENTS

| | | |
|---|---|---|
| WO | 2017186582 A1 | 11/2017 |
| WO | 2018014131 A1 | 1/2018 |

OTHER PUBLICATIONS

Mohanad Obeed, et al., "DC-Bias and Power Allocation in Cooperative VLC Networks for Joint Information and Energy Transfer", arXiv:18.11791v1 [cS.IT], undated, pp. 1-12.

Sung-Man Kim, et al., Optical Engineering 52(4), 043205, SPIEDigitalLibrary.org/oe, "Wireless Optical Eneergy Transmission Using Optical Beamforming", Apr. 2013, pp. 1-6.

Gaofeng Pan, et al., IEEE Access, vol. 7, 2019, "Simultaneous Lightwave Information and Power Transfer: Policies, Techniques, and Future Directions", Mar. 18, 2019, pp. 28250-28257.

Panagiotis D. Diamantoulakis, et al., "IEEE Transactions on Green Communications and Metworking, vol. 2, No. 3, Simultaneous Lightwave Information and Power Transfer (SLIPT)" Sep. 2018, pp. 764-//3.

US Food and Drug Administration, HHS, Parklawn Dr., Room 1-23, Rockville, MD 20857, "1040—Performance Standards for Light-Emitting Products", as amended Mar. 28, 1994, pp. 605-623.

Sung-Man Kim, SPIE, "Optical Beamforming for Communication and Power Transmission", Feb. 6, 2014, pp. 1-4.

Webpage: https://www.wi-charge.com/technology.

* cited by examiner

OPTICAL WIRELESS CHARGING AND DATA TRANSMISSION SYSTEM

CROSS-REFERENCE TO PRIOR APPLICATIONS

This application is the U.S. National Phase application under 35 U.S.C. § 371 of International Application No. PCT/EP2020/058554, filed on Mar. 26, 2020, which claims the benefit of European Patent Application No. 19167722.8, filed on Apr. 8, 2019. These applications are hereby incorporated by reference herein.

TECHNICAL FIELD

The present disclosure relates to an optical wireless charging and wireless data transmission systems and methods of using these systems, as well as to a controller for use in such a system.

BACKGROUND

Light Fidelity (Li-Fi) refers to techniques whereby information is communicated in the form of a signal embedded in visible light, infrared light or ultraviolet light emitted by a light source. Such techniques are sometimes also referred to as coded light, visible light communication (VLC), optical wireless communication (OWC), or free-space optical communication (FSO). The signal is embedded by modulating a property of the light, typically the intensity, according to any of a variety of suitable modulation techniques. For communication at high speed, often Infrared (IR) rather than visible light communication is used.

Based on the modulations, the information in the Li-Fi coded light can be detected using any suitable light sensor. For example, the light sensor may be a photodiode. The light sensor may be a dedicated photocell (point detector), an array of photocells possibly with a lens, reflector, diffuser or phosphor converter, or a camera comprising an array of photocells (pixels) and a lens for forming an image on the array. E.g., the light sensor may be a dedicated photocell included in a dongle which plugs into a user device such as a smartphone, tablet or laptop, or the sensor may be the general purpose (visible or infrared light) camera of a mobile user device, such as an array of infrared detectors initially designed for 3D face recognition. Either way this may enable an application running on the user device to receive data via the light.

For instance, this enables that a sequence of data symbols may be modulated into the light emitted by a light source, such as light emitting diodes (LEDs) and laser diodes (LDs), faster than the persistence of the human eye. Contrary to radio frequency (RF) communication, Li-Fi preferably uses a line-of-sight connection between the transmitter and the receiver for best performance.

Li-Fi is often used to embed a signal in the light emitted by an illumination source such as an everyday luminaire, e.g. room lighting or outdoor lighting, thus allowing use of the illumination from the luminaires as a carrier of information. The light may thus comprise both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

Wireless optical networks, such as Li-Fi networks, enable electronic devices like laptops, tablets, and smartphones to connect wirelessly to the internet. Wi-Fi achieves this using radio frequencies, but Li-Fi achieves this using the light spectrum which can enable unprecedented data transfer speed and bandwidth. Li-Fi is becoming more and more popular as LED lighting systems are used in place of conventional lighting systems. Contrary to WiFi, LiFi is directional and shielded by light blocking materials, which provides it with the potential to support higher bandwidth communication, using a larger number of access points, in a dense area of users as compared to WiFi.

Furthermore, LiFi can be used in areas susceptible to electromagnetic interference. Consider that wireless data is now often required for more than just traditional connected devices—today televisions, speakers, headphones, printer's, virtual reality (VR) goggles and even refrigerators use wireless data to connect and perform essential communications.

It is possible to not only provide communication functions to remote devices using various signal types (e.g. WiFi and LiFi), but also to wirelessly provide power to these remote devices. It is possible to use radio frequency signals (e.g. signals usually used in WiFi) to provide power. However, these techniques often result in low efficiency power transfer and low levels of power transfer.

Wireless optical charging, or power transmission, refers to techniques whereby electrical power is transferred using light. The use of light instead of radio frequency radiation allows for higher levels of power transfer. For example, high power lasers can be used for wireless transmission of higher amounts of energy than radio waves due to its directionality. Thus the use of light enables supplying sufficient power levels not only to charge remote devices, but potentially to provide enough power to run the device without a battery.

Therefore, as explained above in reference to the use of luminaires to provide data to devices, luminaires may similarly be used to wirelessly provide power to remote devices.

The provision of data and power by emission of light may also be carried out simultaneously. Beams of light used for data and beams of light used for supplying power may be provided by separate light sources in the same apparatus (e.g. a luminaire). Alternatively, the data and power may be provided simultaneously by the same light source in the same beam of light. In the same way as described above, modulation of the light to embed a detectable signal results in the communication of data, additionally illumination by a sufficiently intense modulated light may also provide power.

An example of a method and system wherein energy and communication are provided in unison may be found in Simultaneous Lightwave Information and Power Transfer: Policies, Techniques, and Future Directions, by Gaofeng Pan, et al, published in IEEE ACCESS, vol. 7, March 2019. Here LED lamps are adopted as energy sources and large area photodetectors are used as redeiveds to collect as much energy as possible, apart from Simultaneous Lightwave Information and Power Transfer (SLIPT) also MIMO SLIPT and Hybrid VLC-RF SLIPT is disclosed.

Devices incorporating detectors for collecting light for the purposes of charging are available. For example, portable chargers comprising photodetectors such as photovoltaic cells have been used for some time. Some newer mobile phones are being produced with photovoltaic cells integrated into the screens. Such photodetectors enable charging of such devices using daylight.

Beam-steering or beam-shaping refers to techniques for directing or focusing signals in a certain direction. This can be implemented for reasons of efficiency, e.g. so that signals with limited energy may travel over an increased range by focusing their transmission energy within a more limited range of angle. Similarly, beam-steering or shaping can be performed for the purpose of optimizing power delivery by directing the transmitted beams only towards where they are needed. For example, this can be used to direct a beam to fall only on the photodetector of a device, and as little as possible in the area around the photodetector which is not capable of converting the beam into energy. Beam-steering or beam-shaping can also be implemented for reasons of safety. Some types of radiation, such as high powered laser beams, can be damaging to the eyes or skin. As such it can be important to control the direction of emission of such beams so that injuries do not occur and health hazards do not exist.

SUMMARY

There are many situations where provision of data or power are not necessarily desired. Many of these situations depend on the context of the situation in which these functions are being provided. Without knowledge of this context it is possible to provide power or data in impractical or wasteful locations, data in insecure ways, or generally provide a system which is inefficient, ineffective or even harmful in the provision of either or both of these functionalities.

It has been recognized that by providing various types of contextual information, a system configured to function to provide data and/or power may be optimized. The contextual information can comprise properties of the receiving device (e.g. the device being charged and/or receiving transmitted data), properties of the system itself (which may or may not comprise the receiver device), and/or properties of the environment (the environment of the system, the receiver device, or both). Therefore it can be seen that, based on the insight provided by such information, there can be situations where there exists a preference for a particular setting or settings for the available functions of the system.

A controller of the system may use these properties to select the function of one or more transmitter nodes of the system. The functions of the transmitter nodes are emitting a beam of light to charge a receiver device and transmitting data to the receiver device. The controller may then, based on one or more properties of the receiver device, the system, and/or an environment of the system, perform a selection between these two functions. Alternatively the controller may perform both the functions and select a relative proportion of a charging power used to charge the device and a data power of the data transmitted to the receiver device.

Hence, according to a first aspect disclosed herein, there is provided an optical wireless charging and data transmission system, the system comprising a plurality of transmitter nodes operable to perform a first function of emitting a beam of light to charge a receiver device and a second function of emitting a beam of light to transmit data to the receiver device; and a controller configured, for each of the transmitter nodes, to perform a selection by selecting between performing the first function and the second function; wherein the controller is configured to perform the selection for each of the plurality of transmitter nodes based on one or more properties of the system comprising the spatial configuration of the system and one or more properties of the receiver device comprising the location of the receiver device relative to the system, by selecting a first transmitter node of the plurality of transmitter nodes for transmitting data to the receiver device and selecting a second transmitter node of the plurality of transmitter nodes for charging the receiver device.

Preferably, the first transmitter node and the second transmitter node are directional transmitter nodes, arranged to adapt the direction of their respective beam of light, by either changing the direction and/or shape. By doing so, the transmitter nodes can provide a light beam from distinct spatial locations at a higher energy efficiency, and as a result from the respective different origins allows a receiver having directional selectivity to distinguish the light from the respective source thereby allowing energy and data to be handled separately at the receiver.

Preferably the controller is arranged to effectuate the adaptation of the direction of the respective beam of light by the first transmitter node and the second transmitter node towards the receiving device. The controller may exchange information in the form of commands or configuration data with the transmitters to configured the transmitters based on the spatial locations of the system and the relative location of the receiver.

Disclosed is that the data may be embedded in the same beam of light as used to charge the device, or could be transmitted in a separate beam of light or other radiation such as radio.

In embodiments each of the transmitter nodes is a luminaire.

In embodiments the transmitting data may be a one-directional broadcast from the transmitter node to one or more receiver devices. Alternatively, the transmitting data may be part of a bi-directional communication event. That is to say the transmitter node may also be capable of receiving transmitted data from the receiver device. Similarly the receiver device may also be equipped with a transmitter as well as a receiver. As a result, the transmitters and receivers may be transceivers configured to carry out such a bi-directional communication event.

As discussed the properties of the system comprise a spatial configuration of the system. In embodiments the properties of the system may comprise a technical configuration of the system, e.g. technical capabilities of one or more transmitter nodes of the system.

The system comprises a plurality of transmitter nodes, and the controller is configured to perform said selection, for each of the plurality of transmitter nodes.

The controller may be implemented in one of the plurality of the transmitter nodes, distributed throughout some or all of the transmitter nodes, or implemented elsewhere such as in a server.

The power beam may for example be an infrared radiation beam. The data beam may be for example an infrared radiation beam. Also disclosed is that the data beam may be a radio frequency radiation beam.

The controller is configured to perform the selection at least based on one or more properties of the system, and the one or more properties of the system comprise a spatial configuration of the system.

The controller is configured to perform the selection at least additionally based on one or more properties of a receiver device, and the one or more properties of the receiver device comprise a location of the receiver device relative to the system.

A transmitter node may provide both the beam of light to charge a receiver device and the transmitting data to the receiver device via a same beam of light, and the controller may be configured to perform the selection by controlling a data rate provided by said same beam of light to be reduced or increased, and increasing or reducing, respectively, the charge power provided thereby at least additionally based on one or more properties of the receiver device.

In embodiments, the properties of the receiver device may comprise at least one of a battery level, a required downlink data rate, a required downlink bandwidth, a device type, an owner name, an operating mode.

In embodiments, the controller is configured to perform the selection for each of the transmitter nodes at least based on one or more properties of the system and additionally one or more properties of a receiver device, where the properties of the receiver device comprise a minimum data rate required by the receiver device, and the properties of the system comprise locations of the transmitter nodes; the controller being configured to perform said selection by selecting to provide the transmission data via one or more of the plurality of transmitter nodes that are furthest from the receiver device while still being capable of providing the minimum data rate, and to provide the charging beam from one or more others of the transmitter nodes closer to the receiver device.

In embodiments, the controller is configured to perform the selection such that transmitter nodes with higher bandwidth capability provide the transmitting data at least based on properties of the system, and the properties of the system comprise an available bandwidth of each of the plurality of transmitter nodes.

In embodiments, the controller is configured to perform the selection such that transmitter nodes which emit beams overlapping in a local area only emit power beams and not data, the selection being at least based on one or more properties of the system, and the properties of the system comprising position information of each of the transmitters.

In embodiments, the controller is configured to perform the selection such that transmitter nodes with interrupted lines of sight only emit power beams or low data rate data beams, the selection being at least based on one or more properties of the system, wherein the one or more properties of the system comprise line of sight information for each of the transmitter nodes.

Light is a line of sight based medium where transmitted waves travel in a straight line or direct path from the source to the receiver. Interruptions to the line of sight of light by solid objects blocks the transmission of the light. As a result the function of the light, transmitting data and/or charging a receiver device, is also interrupted by breaking the line of sight path of the light.

A controller may be configured to perform the selection such that external transmitter nodes only perform the second function during daylight hours and perform the first and second function outside daylight hours, the selection being at least based on properties of the system and one or more properties of the environment, where the properties of the system comprise location information for each of the transmitters and the one or more properties of the environment comprise daylight hour information.

Such a controller is configured to perform the selection such that the transmitter nodes perform the first and second function during opening hours and only perform the first function outside opening hours, the selection being at least based on one or more properties of the environment, where the one or more properties of the environment comprise opening hour information.

For example, the opening hour information may be the opening hours of a school, an office, a shop, etc. In this embodiment the transmitter nodes may be external transmitter nodes, internal and external transmitter nodes, or only internal transmitter nodes of the particular environment in question.

In embodiments, the controller is configured to perform the selection at least based on one or more properties of the environment, and the one or more properties of the environment comprise environmental interference.

In embodiments the environmental interference may comprise electromagnetic interference, daylight, ambient light from other sources of light e.g. computer screens, phone screens, desk lights, remote control devices, laser pointers, projectors, etc. The other sources of light may be part of one or more other systems, e.g. a computer system, another lighting system, etc.

In embodiments, the environmental interference comprises airborne interference; and the controller is configured to perform the selection such that transmitter nodes with airborne interference emit only the beam of light to charge and do not transmit data.

For example, the airborne interference may be fog, smoke, or other non-air particles which may cause dispersion or diffraction of the beam of light.

According to a second aspect disclosed herein, there is provided a controller for use in an optical wireless charging and data transmission system, the system comprising a plurality of transmitter nodes operable to perform a first function of emitting a beam of light to charge a receiver device and a second function of emitting a beam of light to transmit data to the receiver device; the controller configured to, for each of the transmitter nodes, perform a selection by selecting between performing the first function and the second function; wherein the controller is configured to perform the selection for each of the plurality of transmitter nodes based on one or more properties of the system comprising the spatial configuration of the system and one or more properties of the receiver device comprising the location of the receiver device relative to the system, by selecting a first transmitter node of the plurality of transmitter nodes for transmitting data to the receiver device and selecting a second transmitter node of the plurality of transmitter nodes for charging the receiver device.

According to a third aspect disclosed herein, there is provided a method of controlling by a controller a plurality of transmitter nodes in an optical wireless charging and data transmission system, the one or more transmitter nodes operable to perform a first function of emitting a beam of light to charge a receiver device and a second function of emitting a beam of light to transmit data to the receiver device, the method comprising: performing a selection, for each of the transmitter nodes, by selecting between performing the first function and the second function; wherein the controller performs the selection for each of the plurality of transmitter nodes based on one or more properties of the system, and/or an environment of the system comprising the spatial configuration of the system and one or more properties of the receiver device comprising the location of the receiver device relative to the system, by selecting a first transmitter node of the plurality of transmitter nodes for transmitting data to the receiver device and selecting a second transmitter node of the plurality of transmitter nodes for charging the receiver device.

In an advantageous embodiment, the first transmitter node and the second transmitter node are directional transmitter nodes, capable of adapting the direction of the beam of light and the method comprises, the controller controlling the first transmitter node and the second transmitter node to adapt their beam of light towards the receiver device based on the spatial information of the system and the location of the receiver device.

According to a fourth aspect disclosed herein, there is provided a computer program product comprising code embodied on computer-readable storage and configured so as when run on a controller to perform the operations of the above methods.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

This invention relates to systems for wireless charging by means of light and data transmission. Recently mobile phone manufacturers have announced including within screens integrated photovoltaic (PV) cells for daylight charging. It is also known that infrared (IR) beams may be used for IR charging indoors. It has been asserted that only IR can deliver a beam that fits into reasonable-sized receivers from a non-trivial distance. Further, that the combination of efficiency and safety show that IR can deliver 100× the energy of best-case radio frequency (RF) technologies.

Embodiments herein utilize the LiFi emitters in existing systems as the radiating devices to generate beams of light for charging. An advantage of utilising this existing system is the provision of a combination of the functions of charging and data transmission using already installed LiFi transmitters and systems. There is thus availability to use these emitters for the data transmission as well as for charging.

The emitting of high power beams of light to cover the full area where potentially chargeable devices might be located results in waste of energy. Similarly, the number of emitters would have to be enormous to cover the whole of this area, and constant emission of high energy beams of light over this area would waste significant amounts of energy. By using already existing transmitters with beam-steering or beam-shaping capabilities, a system capable of efficiently providing these two functions is already in place, requiring little modification or adaptation to implement a technically advanced wireless charging and data transmitting system.

It is recognised herein that when providing a wireless charging and data transmission system, the addition of contextual information such as properties of the system, the receiving device, and the environment, can substantially improve the efficiency and performance of the system.

Figure 1:
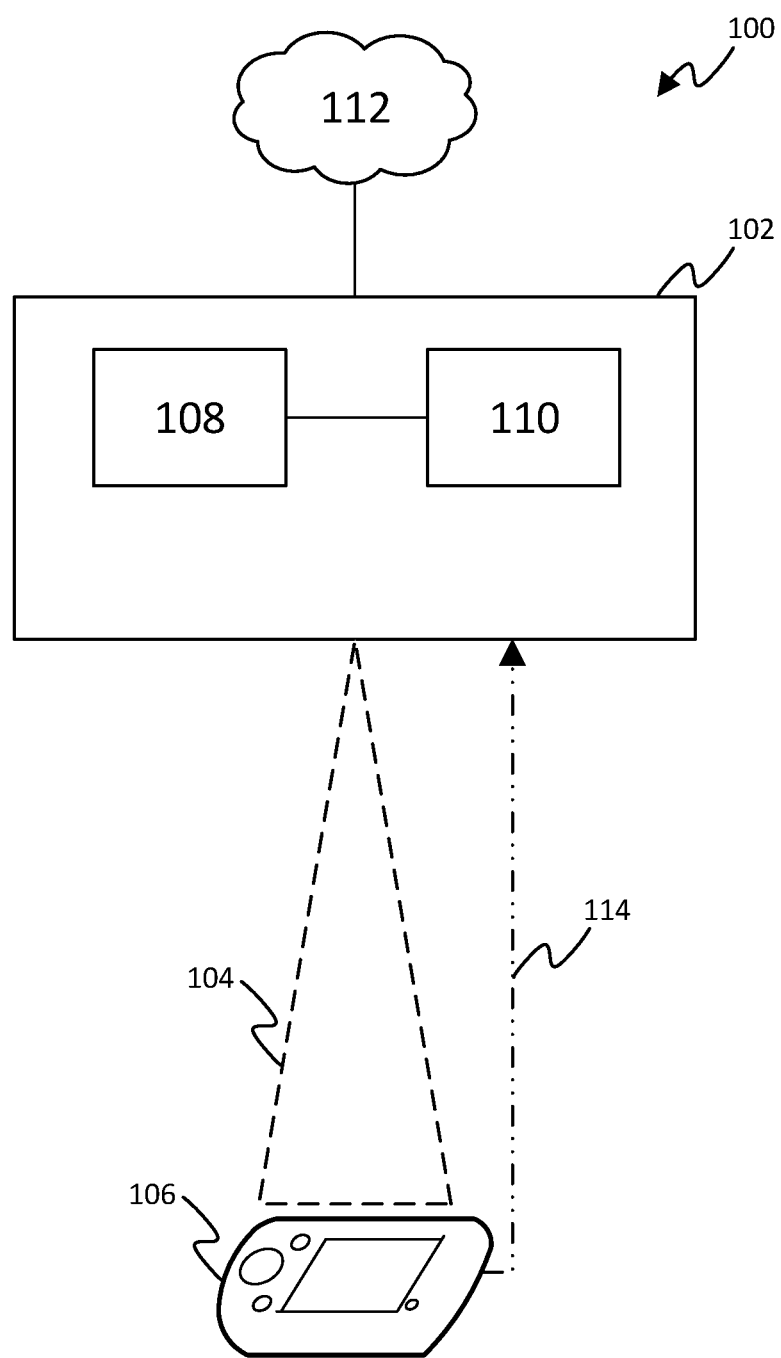
FIG. 1 shows an example wireless charging and data transmission system.

FIG. 1 shows an example of a wireless charging and data transmission system 100. The system comprises at least one transmitter node 102. The transmitter node is configured to provide the functions of emitting a beam of light 104 to charge a receiver device 106, and transmitting data to a receiver device 106. The transmitter node 102 is connected to controller 108. The controller 108 is coupled to at least one transmitter node 102. The or each transmitter node 102 may also be connected to data source 110, network 112, and also via a feedback signal 114 to the receiver device 106.

The receiver device 106 can be any of the above mentioned devices which require a source of power (e.g. electrical charge or energy), in order to operate. For example, it may be an electronic device such as a laptop, tablet, smartphone, smart sensor (e.g. $CO_2$ sensor), television, speaker, headphones, printer, virtual reality (VR) goggles, or even a kitchen appliance such as a refrigerator. It should be understood that any receiver device which requires electricity to operate (either directly from a source, or via the charging of an internal battery), is capable of receiving electrical energy via the charging function of the present system provided it comprises the appropriate light receiver. That is, any suitable light sensor able to convert incident beams of light into an electrical current. For example, this can be a dedicated photovoltaic cell (PV cell), or an array of PV cells. A photovoltaic cell may also be referred to as a solar cell, or a solar panel, etc. The light receiver may be a dedicated photovoltaic cell included in a dongle which plugs into a receiver device such as a smartphone, tablet or laptop. This enables the receiver device to receive power via the beam of light.

The controller 108 is operatively coupled to the at least one transmitter node 102, and is configured to perform a selection between multiple possible configurations of the available functions of the transmitter node 102.

In embodiments the controller may be located within the transmitter node 108 and form part of the same apparatus, as shown in FIG. 1.

Figure 2:
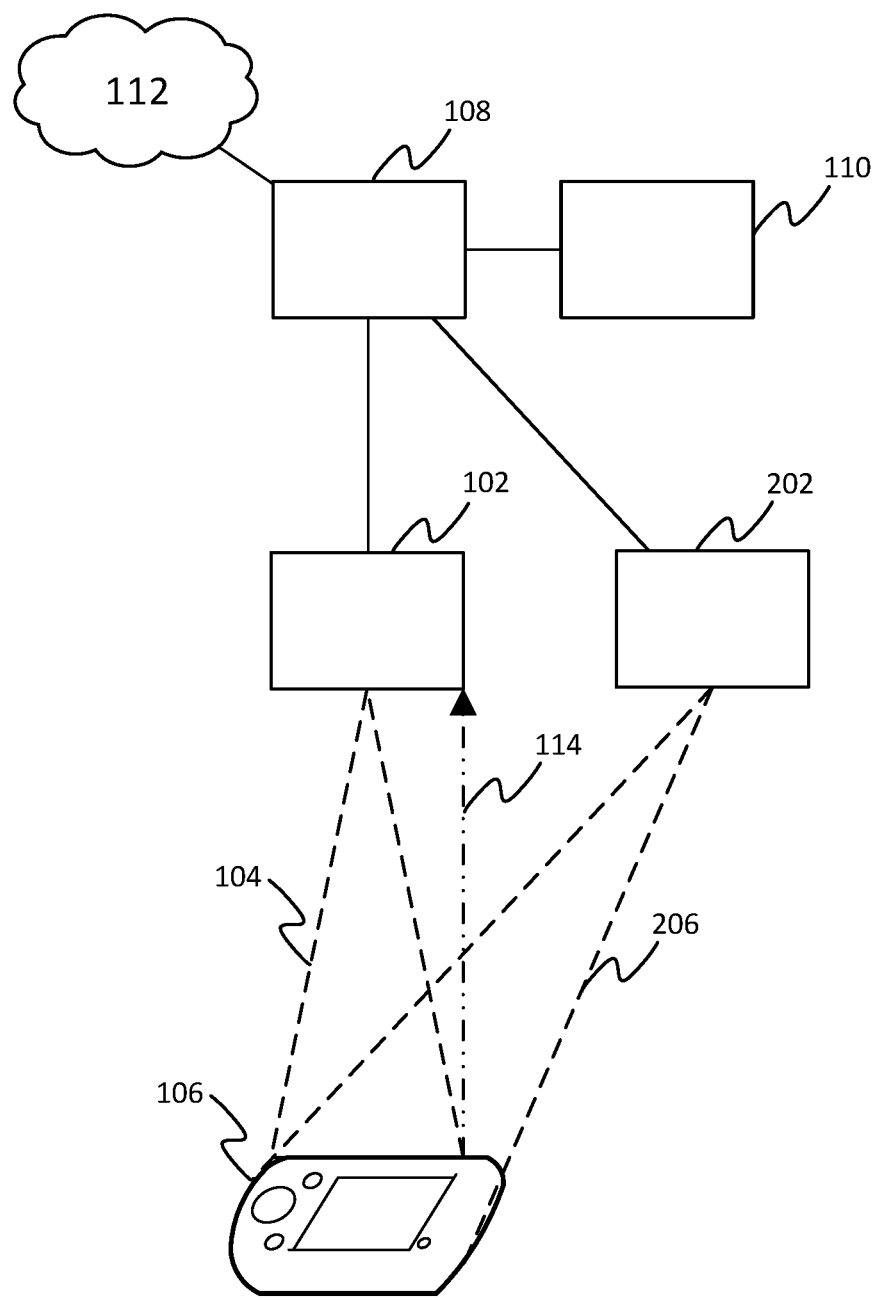
FIG. 2 shows another example wireless charging and data transmission system.

In embodiments the controller 108 may be located externally to the one or more transmitter node 102 and connected thereto, as shown in FIG. 2. E.g. the controller may be implemented in a dedicated control unit or on a server. In another alternative the controller 108 could be a distributed function distributed through some or all of the transmitter nodes 102, or any combination of the above approaches. Wherever implemented, the controller 108 may be implemented in the form of software stored in memory comprising one or more memory units employing one or more memory media (e.g. electronic memory such as an SSD, flash memory or EEPROM or magnetic memory such as a magnetic disk drive) and arranged to run on processing apparatus comprising one or more processing units (e.g. CPUs, GPUs, and/or application specific processors). Alternatively the controller 108 could implemented in dedicated hardware circuitry, or configurable or reconfigurable circuitry such as a PGA or FPGA, or any combination of hardware and software.

The controller 108 may select, for each transmitter node 102 it is connected to, between the function of emitting a beam of light 104 to charge the receiver device 106 and the function of transmitting data to the receiver device 106. Thus the controller 108 selects to operate the transmitter node 102 as either a source of data or a source of power.

Alternatively, the controller 108 may, for each transmitter node 102 it is connected to, perform both the function of emitting a beam of light 104 to charge the receiver device 106 and the function of transmitting data to the receiver device 106 at the same time. In this case the controller 108 then selects a relative proportion of a charging power used to charge the receiver device 106 and a data power of the data transmitted to the receiver device 106. Thus, there is provided a process whereby the power to charge the receiver device and the data power of the data transmitted to the receiver device can be balanced based on one or more properties of the system 100, the receiver device 102, and/or the environment. The controller may adapt the direction of the emitted beam for charging or the transmitted data to target the receiver device.

A reason for needing to adapt the power of the charging beam when also transmitting data in the same beam can be due to the depth of modulation (or data power) for transmitting data and how this relates to the intensity of the beam for transmitting power. Increasing the charging power can limit the useful bandwidth of the transmission of data. For example, at the top end of a range of charging power, to increase the charging power of the beam it may be necessary to reduce the depth of modulation (e.g. so that a maximum power output of an apparatus is not exceeded). However, reducing the depth of modulation of the intensity of the light beam effects the signal to noise ratio, and thus effects the useful data bandwidth of the beam. Driving at a high data rate requires a depth of modulation significant enough to maintain a good signal to noise ratio. Therefore setting a high charge power with a high data rate may prevent the ability to sustain a sufficiently good signal to noise ratio (due to not having deep enough modulations in order to achieve that high charging power), and thus the high data rate is not reliably achievable. So to obtain a high data rate reliably, the higher charge power is not a sensible setting because the quality of the data transmitted will likely be low. To achieve a high data rate it may therefore be necessary to reduce the charge power in order to maintain or improve the signal to noise ratio for a high data rate transmission. The depth of modulations and data power (power of the modulating part of the light beam), are thus directly related, and increasing the depth of modulations can allow for a higher data rate. The opposite adjustment can be made in order to achieve a higher charging power when a lower data rate is acceptable (e.g. when a higher data rate is not required).

Another reason for needing to adapt the power of the charging beam when also transmitting data in the same beam can be due to the limitations of the receiver device. For example, a receiver device such as a smartphone, receiving both wireless power and LiFi, may heat up substantially during the wireless power transfer. This can be caused by the limited efficiency of the IR photocell in the receiver device. If the smartphone is of a type with a photocell which is prone to heating up too much, or informs the controller via a feedback signal that its internal temperature has reached an upper limit, the controller of the system may reduce the transferred charging power. The reduction in charging power may in turn enable a simultaneous increase in the available LiFi bandwidth. Avoiding the heating up of the receiver device during wireless charging is a significant consideration and challenge. This can be particularly the case when considering wearable devices such as a smartwatch, headphones, VR goggles, smart glasses, and smart jewellery, etc.

The properties of the system, the receiver device, and/or the environment may be obtained by the controller 108 from a data source 110. The data source 110 may be located externally to the transmitter node 102, but connected to the system 100. For example, the data source 110 may be connected to the controller 108. The data source 110 may be connected to the controller 108 when the controller is located externally to the transmitter node 102 or when the controller is located within the transmitter node 102 itself. The data source 110 may be embodied on memory of a component of the system 100. For example, the memory may be part or all of a memory of the transmitter node 102, or the controller 108. The data source 110 may be embodied on memory of a connected dedicated storage device such as a hard drive, a disk in a disk drive, a USB drive, etc. such that the data comprising the properties of the system, receiver device, and/or environment can be retrieved by the controller 108.

Alternatively or additionally, the properties of the system 100, receiver device 106, and/or environment may be retrieved from a source external to the system 100. For example, the system 100 may be connected to a network 112 and the properties may be retrieved from the network 112. The network 112 may be the internet, and the properties of the system 100, the receiver device, and/or the environment retrieved via the internet.

In embodiments, the controller 108 may retrieve properties of the system, receiver device, and/or the environment from the receiver device 106. The receiver device 106 may provide the properties from its own internal memory or storage. The receiver device 106 may provide the properties from its own current status, e.g. a status of the processor such as overloaded etc., or the status of an application running on the receiver device. Alternatively or additionally, the receiver device 106 may retrieve the properties from a network via a connection to that network, or for example from the internet via its own network connection.

Data may be transmitted to the receiver device from the transmitter node 102 in a specific direction towards the receiver device. This direction may be based on information in a feedback signal 114 transmitted by the receiver device. This feedback signal 114 may be an infrared signal or a radio frequency signal directed generally towards the transmitter node 102 (e.g. within a range of angles which would be visible to a transmitter node on a ceiling). The feedback signal 114 may also be used to negotiate the power or spectral needs for the receiver device, e.g. to provide the properties of the receiver device. Alternatively or additionally, a beacon type signal may be transmitted omni-directionally by the receiver device such that any transmitter node 102 within range of the beacon signal may receive information for the purposes of directing, from the transmitter node 102, any transmitted data and/or a beam of light to charge the receiver device 106.

The controller 108 may adapt the direction of the transmitting data or the beam of light to charge the receiving device based on one or more properties of the receiver device, the system, and/or the environment. These may be properties other than simply the direction in which the receiving device is located. Alternatively, the transmitted data and charging beam of light may be provided in a fixed direction, where the controller 108 determines which function, or to what extent each function, is provided in that fixed direction based on one or more properties of the receiver device, the system, and/or the environment.

The properties of the system may comprise: type of transmitter node (e.g. type of light-spotlight, up-light, desk lamp, floodlight, etc.); data transmitting capabilities of each transmitter node in the system (e.g. available bandwidth, available data rate, etc.); charge power capabilities of each transmitter node in the system; the spatial configuration of the system, e.g. relative positioning information for the transmitter nodes in the system; absolute location information for each transmitter node (e.g. location using GPS or longitude and latitude (e.g. determined by the transmitter node, or on installation by another device); height above the floor level); orientation of the optical exit window and/or emitted beam (e.g. vertical, horizontal, at a specific angle to horizontal/vertical, up-lighting, etc.); and/or other devices in the system (e.g. the system may include different types of devices such as autonomous vehicles, sensors, etc. which are also sensitive to beams of light), etc.

The properties of the receiver device may comprise: type of device (e.g. comprising the specification information and/or model number of the device, etc.); battery level; battery power consumption rate; current processor speed; required data rate or bandwidth; current data rate or bandwidth (e.g. provided by its own network connection, or via a connection to another system or another transmitter node of the same system); light sensor type; orientation of the optical sensor (e.g. vertical, horizontal, at a specific angle to horizontal/vertical, etc.—may be derived from orientation of whole device); and/or receiver device user information (e.g. age, job type, etc.); etc.

The properties of the environment (which may include the environment of the receiver device as part of the system, or only the environment of the system without the inclusion of the receiver device) may comprise: floorplan or layout information of a room, floor, building, street block, or neighborhood in which the system is installed; features of the environment (e.g. positions of ceiling fans, walkways, printers, water coolers, sliding doors, desks, etc.); time of day; sunset and sunrise times; power supply costs and any time of day adjustments; other systems of devices (e.g. autonomous vehicles, fire detection systems, heating systems, gas systems, other smart systems); and/or weather; etc.

In an embodiment, the system may comprise a single transmitter node 102. The controller 108 may select between the functions of the transmitter node 102, based on properties of the receiver device, the system and/or the environment.

For example, the controller 108 may determine, e.g. based on properties of the receiver device 106, that the receiver device 106 is not equipped with a light collector for charging, and thus the transmitter node need only provide transmitting data to the receiver device 106. The controller 108 may determine, e.g. based on properties of the receiver device 106, that sufficient bandwidth is available to the device via its own network connection, and thus only power for charging is required from the transmitter node 102. Similar scenarios which require only one or the other of the two functions may be determined using a combination of properties of the receiver device, the system, and/or the environment. Examples of properties are given above. Example of such scenarios are discussed below.

Similarly, in an embodiment where the system comprises a single transmitter node 102, the controller 108 may provide both of the functions of the transmitter node 102, and based on properties of the receiver device, the system and/or the environment, select a relative proportion of a charging power used to charge the device and a data power of the data transmitted to the device.

For example, the data rate of the transmitted data may be reduced in order to enable an increase in the amount of energy to be contained in the beam of light to charge the receiver device. This relative proportion may be selected based on properties of the receiver device such as required data rate for performing a particular task, or required power for performing a particular task. The receiver device may only be provided with power at times when there is only a small amount of transmitted data (LiFi) bandwidth needed.

In embodiments, the system may comprise multiple transmitter nodes 102. In such embodiments, offloading the particular functions of charging and/or transmitting data to particular transmitter nodes within such a system can provide advantageous configurations in certain scenarios. Examples of such scenarios and the properties on which these selections might be made are discussed below.

In embodiments, the receiver device may be another transmitter node. For example, a first transmitter node, e.g. a battery operated lighting device, may sometimes be charged by second transmitter node e.g. a ceiling lighting device with mains voltage. At the same time the first transmitter node (e.g. the same battery operated lighting device), may also charge a further receiving device (e.g. a small LED candle in its vicinity), using its own emitted beam of light for wireless charging and thus also transmit power.

FIG. 2 shows an example of a wireless charging and data transmission system 100 comprising a plurality of transmitter nodes 102, 202. Each transmitter node is connected to the controller 108. It should be understood that the connection of each transmitter node to the controller 108 could be enacted by connecting the transmitter nodes to each other, e.g. chained together by respective connections or connected in series, where only one of the transmitter nodes is then connected directly to the controller 108; or by connecting each transmitter to the controller 108 via individual separate connections, as shown in FIG. 2; or by any combination of the two.

In FIG. 2, a transmitter node 202 is shown providing the transmitted data and/or the charging beam of light in a direction towards the receiver device 106. This may be in response to additional information other than the need to charge the device or a scheduled time for charging provided to the controller 108. For example, it may be determined by the controller 108, e.g. based on properties of the system, that another transmitter node 102 is already providing one of the two functions of transmitting data or charging. Similarly, it may be determined by the controller 108, based on properties of the system, that transmitter 102 is near a window, and therefore should not be used for transmitting data in order to prevent any sensitive data being detected by other receiver devices located outside the window. Thus the controller may select transmitter node 102 to operate only to emit a beam of light to charge the receiver device 106, and select to provide the transmitting data from transmitter node 202. Providing different functions from different transmitter nodes may also have the advantage of providing each function at a specific angle. For example, to improve the safety of the system in terms of hazards to eyes, charging by high intensity beams may be provided preferably from transmitter nodes located closer to directly above the receiver device. Whereas transmitted data may be provided to the receiver device at shallower angles (e.g. from transmitter nodes located further away from the receiver device such that the transmitted data is in a direction pointing straight down). This is because at shallower angles the chances of direct or reflected impact on the eyes is higher. However, the intensity of the transmitting data is typically a lower level than the intensity of the charging beam, and thus less dangerous to the eyes.

Figure 3:
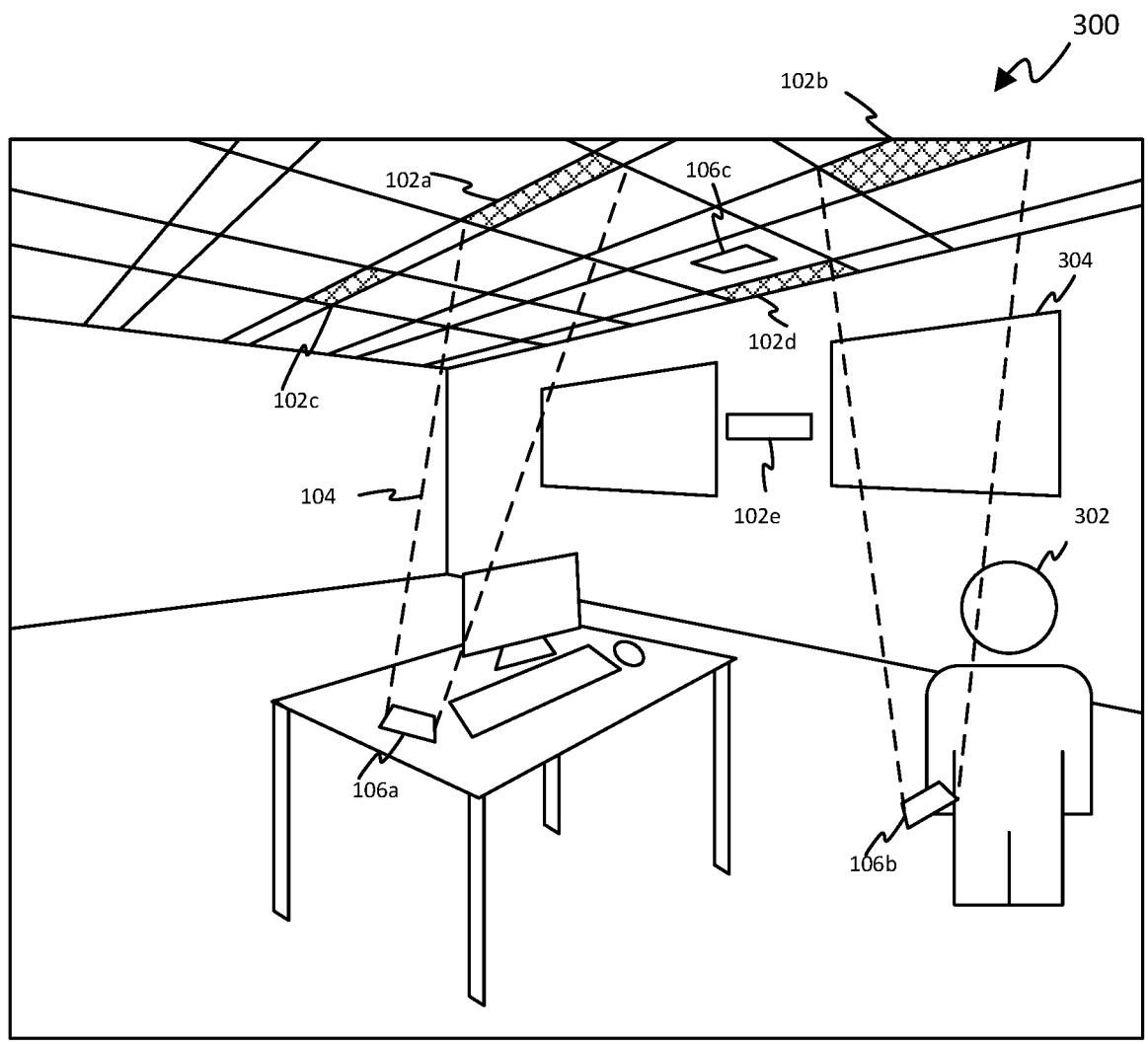
FIG. 3 illustrate an example environment in which the wireless charging and data transmission system may be implemented.

FIG. 3 shows an example environment 300 in which the system 100 may be implemented. Below there are described a number of scenarios implementing the system 100 in the environment 300.

In the illustration of environment 300 in FIG. 3, a smartphone 106a on a desk 302 is charged by means of an IR beam 104 emitted from the ceiling mounted IR transmitter node 102a. Each transmitter node may have different local areas within which it can emit a sufficient beam of light to charge a receiver device. As an example, another receiver device 106b is shown being carried by a person 302 and is shown receiving power from a beam of light emitted by a different transmitter node 102b.

The example scenarios below for implementing the above described system 100 are described in the context of a system comprising a plurality of transmitter nodes 102. However, it should be appreciated that provided with certain information in advance, such as properties of the environment of such a system (e.g. a floorplan showing neighbouring system locations, windows, doors etc.), a system 100 comprising a single transmitter node, a controller 108, and such a data source 110, may function autonomously to select the functions of the transmitter node 102 in such a way as to still account for one or more such properties without being directly linked to neighbouring systems or controlled by a common controller 108.

In an example scenario, the properties of the system may comprise information about the transmitting data bandwidth available to each of the transmitter nodes 102a, 102b (e.g. luminaires) of the system. The properties of the receiver device 106a may comprise a required (downlink) transmitting data bandwidth for performing a certain task. The controller 108 (not shown) may then select, based on this information, to provide the function of transmitting data from e.g. a luminaire 102a able to transmit 1 GB of data per second, instead of using e.g. a neighbouring luminaire 102b which only receives, via an Ethernet cable, 1 MB/s data and therefore has a much lower transmitting data bandwidth available. Thus the controller can determine that the provision of transmitting data by one transmitter node 102a in favour of another transmitter node 102b is the optimal configuration of the system for providing this function, and thus is more suited to be assign to act as the LiFi emitter for this receiver device 106a. This decision may be made in spite of other information about the system, such as the second, lower bandwidth transmitter node 102b being closer to the receiver device 106a.

In a related example scenario, the same properties of the system and receiver device as the previous example may be used. However, in this case, the required data transmitting bandwidth of the receiver device 106a may be lower than that available from the nearest transmitter node 102a. Thus the controller 108 may determine that the required bandwidth may be provided by a transmitter node 102c positioned further away from the receiver device 106a than the transmitter node 102a currently providing the transmitting data to the receiver device. The controller may then select to provide the transmitted data from the further transmitter device 102c instead, leaving the closer transmitter node 102a available for use by another receiver device 106b with higher data bandwidth requirements, or different function requirements. That is to say, e.g. a smart receiver device 102a with a lower bandwidth need can receive the necessary LiFi data signal from a luminaire 102c located a further distance away.

In an example scenario, the properties of the system may comprise floorplan information comprising locations of windows 304 and doors etc. Transmitting data by light is susceptible to said data leaking out of the intended transmission area, e.g. via a window 304 or sliding door. This leaves the data transmitted susceptible to being received by an unintended recipient, or eavesdropped on by hackers. The controller may thus select transmitter nodes 102d positioned close to windows 304 and doors to preferably emit beams of light to charge devices instead of transmitting data. Thus the security of the system is improved.

In an example scenario, the properties of the system may comprise location information for each transmitter node. The properties of the environment may comprise locations of additional elements not on a floorplan, for example ceiling fans, walkways between desks, and commonly visited areas such as water dispensers or printers. These are areas which people or objects may periodically and/or regularly pass by. LiFi and light in general is a line of sight based medium where transmitted waves travel in a straight line or direct path from the source to the receiver. Thus interruptions along this path or line of sight can inhibit the transmitting data or the charging beam reaching the receiver device. Such interruptions are less disruptive to the function of charging than the function of transmitting data, as the missed signal does not correspond to missed data which will be noticed by the receiver device. Therefore, based on such properties of the system and the environment, the controller may select for certain transmitter nodes of the system with interrupted lines of sight to provide the function of charging, and not e.g. transmitting data with a high data rate. Even if the interruption in the line of sight may only be occasional (e.g. by a window or door being occasionally open when it is usually closed), it may still be advantageous to avoid assigning the function of transmitting data to the transmitter node which emits the occasionally interrupted beam. The disruption in the line of sight may only be in certain directions from some transmitter nodes, therefore such nodes may be selected by the controller to provide both transmitting data and charging functions in some directions, and preferably provide only the charging function in one or more other directions. The transmission power of the charging function may be adjusted depending whether or not people are present in the environment. Similarly, the transmission power of the charging function may be adjusted based on the distance between the transmitter node emitting the charging beam of light and a detected person.

In an example scenario, the properties of the system may comprise location information for each transmitter node 102a-e. For example the location information may comprise the height above floor level of the transmitter node 102e. This information can be used to determine if the transmitting node 102e is emitting a beam of light to charge the receiver device, or transmitting data at eye level of people in the environment of the system. As beams of light to charge devices are typically higher powered than transmitted data, such transmitter nodes 102e may be preferably selected by the controller to function to transmit data instead of power. This improves the safety of the system regarding potential eye damage due to high intensity light.

In an example scenario, the properties of the system may comprise orientation information about the transmitter nodes 102a-e. For example, luminaires 102e with vertically oriented optical exit window/IR beams. Based on this information, and information about the location of a receiver device 106c, the controller may select for particular transmitter nodes 102e of the system which are optimally aligned with the orientation of the receiver device 106c to provide the required functions for that receiver device. E.g. luminaires with vertically oriented optical exit window/IR beams are preferably selected to provide the functions of data and/or charging to receiver devices with vertically oriented sensors. This may also require properties of the device in order to determine any differences between the orientation of the receiver device and its light sensor.

In an example scenario, the properties of the system comprise the type of transmitter node, e.g. type of lighting unit, e.g. suspended up-lighting luminaire, and the properties of the environment (or system depending on the degree of integration between systems) comprise the location of smart sensors 106c, particularly smart sensors without a mains power supply. The controller may then select to provide the function of emitting a beam of light to charge a receiver device 106c from transmitter nodes 102e which are up-lighting type luminaires positioned under sensors without a mains power supply.

In an example scenario, the properties of the environment may comprise the weather. For example the presence of fog around or in the local area of external transmitter nodes in the morning. Similarly, the properties of the environment may comprise smoke inside a room or building. The controller may select, based on the presence of this airborne interference, to only emit a beam of light to charge the receiver device. The reason for this restriction is due to the scattering or diffusing nature of such atmospheric conditions or air quality conditions. Transmitting data in such conditions is likely to be ineffective, with data signals getting lost in the diffusing or scattering conditions.

In a related embodiment, the transmitter node may be controlled to emit a beam of light to charge the receiver device only if the properties of the receiver device indicate that the device has a critical status. The properties of the receiver device comprising a critical or non-critical status. The term critical status may mean that the device will not continue to work if it does not receive power immediately or in the near future, or that the device is a critical device, e.g. for safety or regulation compliance such as fire detectors/alarms or temperature controls. Similarly, the reason for this restriction from all receiver devices to only critical receiver devices is due to the scattering or diffusing nature of such atmospheric conditions or air quality conditions. The scattering of charging beams could be a safety hazard, e.g. to eyes. Transmitting data in such conditions is likely to be ineffective, with data signals getting lost in the diffusing or scattering conditions.

In an example scenario, the properties of the environment comprise daylight hours, and the properties of the system comprise internal or external location of the transmitter nodes. The controller may select, based on this information, that external transmitter nodes emit beams of light to charge receiver devices only outside of daylight hours. For example, in street lighting, during daytime there is ample IR light available to power the receiver device via a sensor. Thus the controller may select to operate external luminaires only as LiFi transmitters. Whereas during night time, the controller may select to operate external luminaires to provide the charging functionality as well. This optimizes the system and prevent wasting energy to provide a charging beam of light when it is not required.

In embodiments, the controller may select, based on other properties of the environment such as other time related information, that transmitter nodes only emit beams of light to charge receiver devices outside of certain times, and inside certain times operate to transmit data as well. For example, during and outside of opening hours (e.g. of a shop, a school, an office, etc.), during and outside of daylight hours, etc.

In another example scenario, the properties of the environment comprise the location of smart sensors, and the location or presence of other systems which are sensitive to light e.g. autonomous vehicles. The controller may then select to emit beams of light to charge smart sensors when no other light sensitive systems are present, and provide transmitting data and not provide a charging function when other light sensitive systems are present. For example, in a street lighting environment or warehouses, wireless charging of smart city sensors is provided when no autonomous vehicle is present, and only LiFi is provided when an autonomous vehicle is present.

Further example applications of the techniques disclosed herein may include the following.

IR charging by battery operated transmitter node (e.g. emergency luminaires) only if a high priority receiver device needs charging.

A first luminaire beams IR energy to the receiver device while a second luminaire beams LiFi to the same receiver device. This configuration may be safer. For example, the modulation required to encode data into the transmitted light may result in the peak power being higher in order to maintain the required charging power. The peak power may then fall into a range that is more damaging or dangerous to the eyes. Further, some luminaires which are good at transmitting data as light also produce a lot of glare. This can result in more light reaching the eye of a nearby person. If the charging beam is provided by a different luminaire than the beam used to transmit data, a luminaire which produced less glare can be used to provide the charging beam, thus improving eye safety.

Depending on the integral IR received by an end user s eye over a certain period of time (e.g. today), assign IR charging to transmitter nodes which have the least harmful impact to the user. Similarly, assign based on the location of the user with the highest daily dose so far, or based on age of specific users.

IR charging may be used preferably at a time of low electricity cost, or when there is no demand response event.

It is also possible to assign charging luminaires (for transmitting power) in such a way that reflected IR beams can be observed by an adjacent luminaire. For example IR beams emitted by a first luminaire while charging a receiver device can be reflected from a surface and detected by a second nearby luminaire. Disruption of the optical path of this reflected beam from the first luminaire to the second luminaire, e.g. caused by passing people, can be monitored and used for occupancy detection. That is to say, shadows or voids in the reflected light, or receiving only part of the reflected beam, can be used for presence, motion, or activity detection.

In embodiments, the transmitter node(s) may function in an emergency mode. In such an emergency mode it may be advantageous to assign the transmitter node(s) to a charging only function. This can be used to ensure that standalone environmental sensors charged by the transmitter node have sufficient power to report environmental parameters, such as temperature and smoke. Providing sufficient power can also ensure that such reporting may be performed at a higher frequency than in a normal operating mode, e.g. so that vital information is as up to date as possible. For example, a smoke detector may send sensor data to a building's emergency control system more frequently such that the spread of a fire can be monitored more closely. Alternatively, if the first responders utilize LiFi equipped handheld devices (as for example in some emergency situations the WiFi range may be compromised by wireless interference), it may be advantageous to dedicate the transmitter node(s) entirely to LiFi data transmission during the emergency mode, and not the function of remote charging.

In embodiments, it may be that utilizing battery operated lighting devices for IR charging of receiver devices is permitted only if e.g. no other option is available, or if the mains powered lights or luminaires are occupied with LiFi. For example, a transmitter node, such as a portable lamp, which operates only on battery power has a limited energy budget it would be able to transfer to a receiver device e.g. by emitting a beam of light to charge the device. Thus to save as much of this limited energy as possible the transmitter node may only be activated for the purposes of charging when the receiver device has a low battery. A low battery level being e.g. a battery level below a pre-determined threshold level, e.g. 5%, 10%, 20% 25%, etc. The charging function of the transmitter node may be active in dependence on a rule, for example that the transmitter may only charge a receiver device until its own remaining power falls below a pre-determined threshold level of charge, e.g. 20%, 25%, 30%, etc. The transmitter node need not be portable, for example a fixed emergency lighting until, or a fixed sensor unit, etc. which is battery operated still has the same power limit. The transmitter node may be battery powered to comply with certain regulations which require the unit to have an isolated power source in case of mains power failure. For example, smoke detectors, emergency lighting, other sensors required to work during a power cut, other lighting required to work during a power cut, etc.

Such battery powered devices may also be receiver devices. Such receiver devices may be classed as critical devices, or devices having a critical status. That is, these may be devices which must always have enough power to operate (e.g. smoke detectors, smoke alarms, CO2 detectors, CO2 alarms, burglar alarms etc.). Another reason for classing a device as a critical device may simply be that the power has fallen to a critical level. For example, a very low battery level, 1%, 2&, 5%, 10% etc. Some electronic devices have lengthy power up and power down processes. The powering down of such a device due to an empty battery, which then takes a long time to power up and return to a fully functioning state, can be particularly inconvenient. Therefore avoiding this situation by providing these critical receiving devices with enough power to keep running, e.g. until a better power supply is available, can be advantageous.

It will be appreciated that the above embodiments have been described only by way of example. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller for use in an optical wireless charging and data transmission system, the system comprising:
    a plurality of transmitter nodes operable to perform a first function of emitting a beam of light to charge a receiver device where no data is embedded and a second function of emitting a beam of light to transmit data to the receiver device wherein the data is embedded by modulating the intensity of the light emitted by a light source dependent on the data;
    the controller configured, for each of the transmitter nodes, to perform a selection by selecting between performing the first function and the second function; and
    wherein the controller is configured to perform the selection for each of the plurality of transmitter nodes based on the spatial configuration of the system and the location of the receiver device relative to the system, by selecting a first transmitter node of the plurality of transmitter nodes for transmitting data to the receiver device and selecting a second transmitter node of the plurality of transmitter nodes for charging the receiver device.

2. An optical wireless charging and data transmission system, the system comprising:
    a plurality of transmitter nodes operable to perform a first function of emitting a beam of light to charge a receiver device where no data is embedded and a second function of emitting a beam of light to transmit data to the receiver device wherein the data is embedded by modulating the intensity of the light emitted by a light source dependent on the data; and
    the controller according to claim 1, configured, for each of the transmitter nodes, to perform a selection by selecting between performing the first function and the second function.

3. The system of claim 2, wherein the first transmitter node and the second transmitter node are directional transmitter nodes, arranged to adapt the direction of their respective beam of light, by either changing the direction and/or shape.

4. The system of claim 2, wherein the controller is arranged to effectuate the adaptation of the direction of the respective beam of light by the first transmitter node and the second transmitter node towards the receiving device.

5. The system according to claim 1, the one or more properties of the receiver device comprise a minimum data rate required by the receiver device, and the properties of the system comprise locations of the transmitter nodes; the controller being configured to perform said selection by selecting to provide the transmission data via one or more of the plurality of transmitter nodes that are furthest from the receiver device while still being capable of providing the minimum data rate, and to provide the charging beam from one or more others of the transmitter nodes closer to the receiver device.

6. The system according to claim 1, wherein the controller is configured to perform the selection such that transmitter nodes with higher bandwidth capability provide the transmitting data at least based on properties of the system, and the properties of the system comprise an available bandwidth of each of the plurality of transmitter nodes.

7. The system according to claim 2, wherein the controller is configured to perform the selection such that transmitter nodes which emit beams that are overlapping in a local area only emit power beams and not data, the selection being at least based on one or more properties of the system, and the properties of the system comprising position information of each of the transmitters.

8. The system according to claim 2, wherein the controller is configured to perform the selection such that transmitter nodes with interrupted lines of sight only emit power beams or low data rate data beams, the selection being at least based on one or more properties of the system, wherein the one or more properties of the system comprise line of sight information for each of the transmitter nodes.

9. The system according to claim 2, wherein the controller is configured to perform the selection at least based on one or more properties of the environment, and the one or more properties of the environment comprises environmental interference.

10. The system according to claim 9, wherein the environmental interference comprises airborne interference, and the controller is configured to perform the selection such that the transmitter nodes with airborne interference emit only the beam of light to charge and do not transmit data.

11. A method of controlling by a controller a plurality of transmitter nodes in an optical wireless charging and data transmission system, the plurality of transmitter nodes operable to perform a first function of emitting a beam of light to charge a receiver device where no data is embedded and a second function of emitting a beam of light to transmit data to the receiver device wherein the data is embedded by modulating the intensity of the light emitted by a light source dependent on the data, the method comprising:

performing a selection, for each of the transmitter nodes, selecting between performing the first function and the second function; and wherein the controller performs the selection for each of the plurality of transmitter nodes based on the spatial configuration of the system and the location of the receiver device relative to the system, by selecting a first transmitter node of the plurality of transmitter nodes for transmitting data to the receiver device and selecting a second transmitter node of the plurality of transmitter nodes for charging the receiver device.

12. The method of claim 11, wherein the first transmitter node and the second transmitter node are directional transmitter nodes, capable of adapting the direction of the beam of light, the method comprising:

the controller controlling the first transmitter node and the second transmitter node to adapt their beam of light towards the receiver device.

13. A non-transitory computer readable medium comprising code that when executed by one or more processors of a controller cause the one or more processors to perform the method of claim 11.

* * * * *